United States Patent [19]

Brubaker et al.

[11] 4,057,332

[45] Nov. 8, 1977

[54] PERIPHERALLY COOLED LASER LENS ASSEMBLY

[75] Inventors: Hiram A. Brubaker, Peoria; Gerald P. Simmons, Washington; William E. Streight, East Peoria, all of Ill.

[73] Assignee: Caterpillar Tractor Co., Peoria, Ill.

[21] Appl. No.: 678,846

[22] Filed: Apr. 21, 1976

[51] Int. Cl.² .................................. G02B 5/00
[52] U.S. Cl. ..................... 350/319; 219/121 L; 350/63; 350/253
[58] Field of Search ............... 350/63, 319, 219, 96 R, 350/179-180, 253; 331/94.5, DIG. 1, 94.5 P; 219/121 L, 121 EB; 353/52-61; 63/219

[56] References Cited

U.S. PATENT DOCUMENTS

| 1,716,321 | 6/1929 | Pearson | 350/63 |
| 3,549,043 | 12/1970 | Waite | 350/319 |
| 3,696,230 | 10/1972 | Friedrick | 219/121 L |
| 3,977,251 | 8/1976 | Meginnis | 350/319 |

*Primary Examiner*—John K. Corbin
*Assistant Examiner*—B. W. delos Reyes
*Attorney, Agent, or Firm*—Phillips, Moore, Weissenberger, Lempio & Majestic

[57] ABSTRACT

A fluid cooled lens assembly is provided which comprises a housing mounting a lens or window where a window is a lens with infinite radius of curvature therein and a cooling passage included in said housing for directing coolant fluid around the lens periphery from an inlet through an outlet in the housing. Turbulators in the form of protuberances spaced throughout the cooling passage restrict the flow of fluid and thereby cause turbulence to assist and enhance the heat transfer effect of the fluid. The cooling passage turbulators are formed within one of a pair of mounting rings comprising the housing.

10 Claims, 4 Drawing Figures

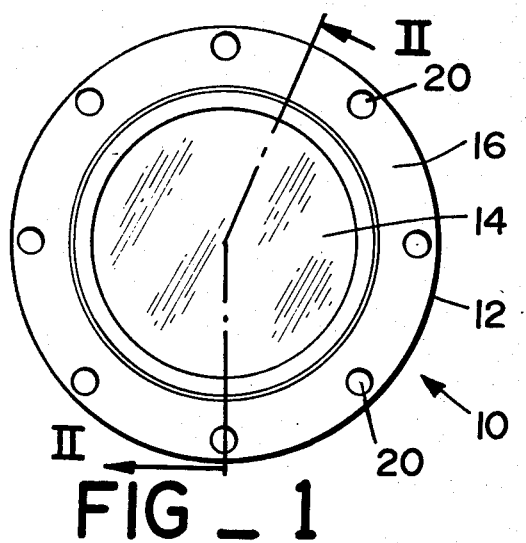
FIG_1
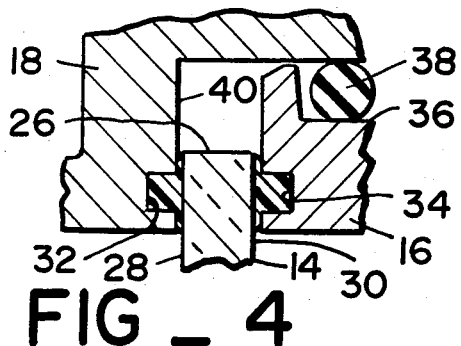
FIG_4
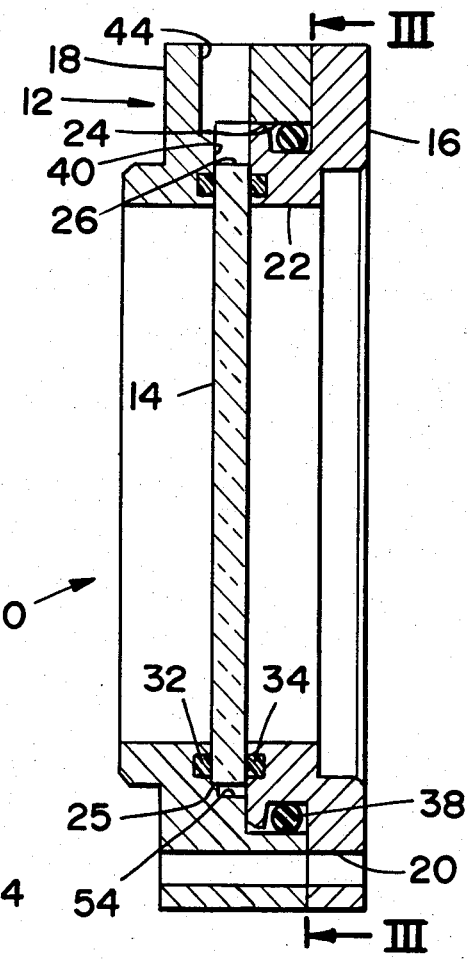
FIG_2
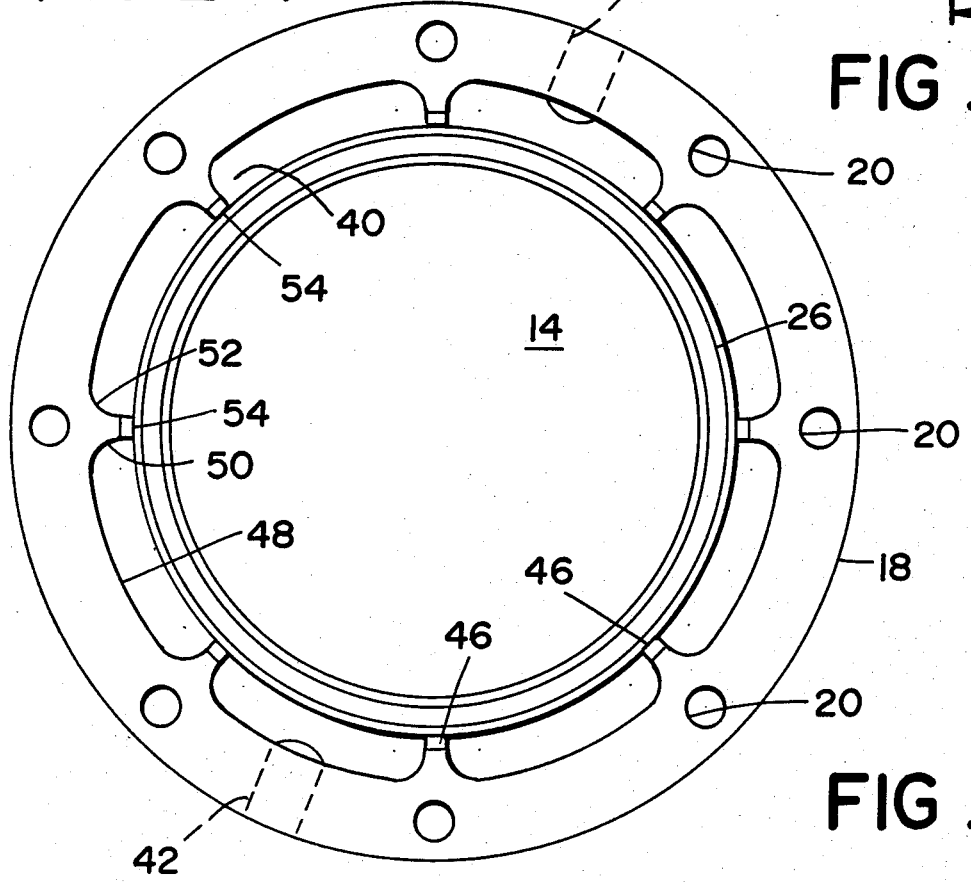
FIG_3

PERIPHERALLY COOLED LASER LENS ASSEMBLY

BACKGROUND OF THE INVENTION

This invention relates to a lens mounting assembly. More particularly, this invention relates to such an assembly including cooling passages therein for peripherally cooling the lens in, e.g., a laser lens application.

High-powered laser beams are finding increasing application in manufacturing industry where they are used to perform a cutting torch or welding function on a workpiece. The rather high-powered lasers use a generated laser beam which is focused or concentrated at the workpiece by means of a lens. Typically, the lens is made of a zinc selenide material. In passing through the lens, the laser beam loses some of its energy which results in an increase in temperature of the lens. This is disadvantageous in that large thermal stresses frequently occur in the lens resulting in cracking and breakage of the lens itself.

Therefore, it is desirable to have some means for cooling the laser lens and preventing an unwanted heating thereof. Advantageously, a gas is also used in the aforementioned cutting operation to assist in cutting and removing the material being cut. This gas generally is admitted to the region such that it first passes over the lens and then exits through a nozzle coincident with the laser beam and impinges upon the workpiece being cut or welded. In addition to very greatly assisting the cutting, removing, or shielding the material being cut or welded, assisting in keeping dirt and dust from depositing on the lens, the gas also functions to convectively cool the lens by passing thereover. The system using the gas for this cooling purpose is shown in U.S. Pat. No. 3,696,230 to Friedrich.

While the system shown in the Friedrich patent is relatively successful for certain laser power outputs, it does not provide sufficient cooling as higher power outputs are encountered. These higher power outputs are a natural progression from initial attempts at welding and cutting smaller workpieces to using lasers to cut and join larger workpieces.

Other patents of interest are U.S. Pat. Nos. 3,597,578 to Sullivan, and 3,569,660 to Houldcroft. However, these patent devices share the deficiency of the aforementioned patent when higher power applications are encountered.

SUMMARY AND OBJECTS OF THE INVENTION

It is therefore the primary object of this invention to provide apparatus for cooling a lens such as used for focusing a laser beam used for cutting or welding a workpiece especially under high laser power output conditions.

It is a further object of this invention to provide such an apparatus in the form of a fluid cooled lens assembly which provides perimeter cooling of the lens to take away heat generated therein such as encountered in laser welding applications.

It is a still further object of this invention to provide a cooled lens housing having cooling passages for effectively cooling a lens through which a beam is passed which is simple in design and efficient in operation.

The invention comprises a fluid cooled lens assembly having a circular lens contained between a housing in the form of a pair of mounting rings. The lens is held within the mounting rings by a pair of resilient seals of plastic material which are molded in place in accommodating grooves in the mounting rings. A cooling passage in one of the mounting rings circumscribes the periphery of the lens for admitting cooling fluid thereto. Cooling fluid such as water enters the housing and thence the passage through an inlet and circulates through the passage, thereby cooling the lens by intimate contact with the lens periphery and exits through an outlet.

In order to enhance the cooling effect, turbulators in the form of protuberances spaced along the cooling passage cause the flow therein to be selectively restricted. In this manner, heat generated within the lens is effectively absorbed by the cooling fluid and discharged through the outlet.

Further and other objects and advantages of this invention will become more readily apparent from a review of the following specification and accompanying drawings.

BRIEF DESCRIPTION OF THE DRAWINGS

FIG. 1 is a front elevational view of a fluid cooled lens assembly of the instant invention;

FIG. 2 is a cross-sectional view taken along the lines II—II in FIG. 1 of the inventive lens assembly;

FIG. 3 is a view taken along lines III—III in FIG. 2 of the lens assembly shown, particularly illustrating the coolant passage and tubulators; and, FIG. 4 is an enlarged cross-sectional view of a portion of the lens assembly of FIG. 2, illustrating the mounting of the lens within the mounting rings.

DETAILED DESCRIPTION

FIGS. 1–4 show the details of construction of the fluid-cooled lens assembly of the instant invention. In FIG. 1 there is shown generally at 10 a lens assembly including a housing 12 for the purpose of holding a lens 14 such as a laser focusing lens. While a laser lens is described in the following specification, it is to be understood that other lenses are also contemplated which require cooling for proper operation thereof.

The housing 12 is comprised of a pair of mounting rings, one of which is shown at 16.

Turning to FIG. 2, it is seen that lens 14 is contained and held between a pair of such mounting rings, 16 and 18. The rings are adapted to be held together by bolts (not shown) extending through a plurality of spaced bolt holes 20 located around the circumference of the mounting rings (see FIG. 1).

Returning to FIG. 2, it may be seen that each of the rings is generally circular in configuration and dimension so that an annular flange portion of mounting ring 16 is fitted within a receiving annular groove 24 in ring 18. Lens 14 is held in groove 25 adjacent the peripheral edge 26 thereof.

As best seen in FIG. 4, the lens is held on its faces 28,30 by means of a pair of resilient plastic seal rings which may be conveniently molded within accommodating annular grooves 32,34, within rings 16,18. As seen in this Figure and in FIG. 2, an annular "O"-ring groove 36 is provided within ring 16 and contains an "O"-ring made of, for example, resilient rubber material for sealing between the rings. A cooling passage 40 is thus formed between the annular rings and the lens periphery 26. This cooling passage is sealed by seals 32,34 and "O"-ring 38. Turning to FIG. 3, cooling passage 40 is shown to be an annular passage circumscribing the peripheral edge 26 of lens 14. Coolant such as water flowing in inlet passage 42 splits into two directions and travels around the periphery 26 of lens 14 to and through outlet 44. In traveling around the periphery of the lens, the cooling fluid absorbs heat and thereby cools the lens, maintaining it at a temperature so as to avoid cracking and other problems.

In order to enhance the heat transfer effect of the fluid, a plurality of equally spaced protuberances or turbulators 46 are provided within passage 40. These turbulators are basically rectangularly shaped protuberances rising from the radially outermost wall 48 of coolant passage 40. The protuberances have smooth radii transition portions 50,52 at their base to assist in directing cooling fluid over small, rectangularly-shaped turbulator openings 54 which assist in restricting the flow of fluid and thereby increasing its velocity along the lens periphery. This increased velocity as well as the turbulance engendered by the turbulators enhances the heat transfer effect of the fluid. It is to be understood that, if required, additional inlets and outlets may be provided around the mounting ring 18 to assist in cooling.

It is also to be understood that the foregoing description is merely illustrative of the preferred embodiment of the invention and that the scope of the invention is not to be limited thereto, but is to be determined by the scope of the appended claims.

We claim:

1. A fluid cooled lens assembly comprising:
a housing including a pair of generally ring-shaped members defining an opening therethrough for admitting energy rays,
a lens mounted in said opening in said housing, said lens defining a peripheral edge, and
cooling passage means in said housing, said cooling passage means comprising a passage within said housing circumscribing said lens peripheral edge and in fluid communication over said entire peripheral edge for directing coolant fluid to said lens peripheral edge for cooling said lens, and inlet and outlet ports in said housing in communication with said passage for admitting cool fluid and removing fluid that has been heated by said lens.

2. The invention of claim 1 further including restriction means in said passage for causing turbulence in said cooling fluid and thereby enhancing the heat transfer effect of the fluid.

3. The invention of claim 2 wherein said restriction means comprises a plurality of spaced protuberances within said passage.

4. The invention of claim 3 wherein said protuberances are equally spaced around said passage.

5. The invention of claim 3 further comprising means mounting said lens adjacent to said peripheral edge.

6. The invention of claim 5 further including seal means intermediate said ring-shaped mounting members for sealing against loss of fluid.

7. The invention of claim 5 wherein said lens defines a pair of generally planar faces on opposite sides of said peripheral edge, and wherein said mounting means is in sealing engagement with said planar faces.

8. The invention of claim 5 wherein said means mounting said lens comprises a pair of resilient seal rings intermediate said lens and each said ring-shaped member.

9. The invention of claim 8 wherein said resilient seal rings are of plastic material.

10. The invention of claim 9 wherein said resilient seal rings are mounted within annular grooves in each said ring-shaped member.

* * * * *